US009656646B2

(12) United States Patent
Kim

(10) Patent No.: US 9,656,646 B2
(45) Date of Patent: May 23, 2017

(54) INTEGRATED ELECTRO-HYDRAULIC BRAKE SYSTEM

(71) Applicant: MANDO CORPORATION, Pyeongtaek-si (KR)

(72) Inventor: Hyun-Jun Kim, Suwon-si (KR)

(73) Assignee: MANDO CORPORATION, Gyeonggi-do (KR)

( * ) Notice: Subject to any disclaimer, the term of this patent is extended or adjusted under 35 U.S.C. 154(b) by 198 days.

(21) Appl. No.: 14/308,377

(22) Filed: Jun. 18, 2014

(65) Prior Publication Data
US 2015/0166028 A1 Jun. 18, 2015

(30) Foreign Application Priority Data

Dec. 13, 2013 (KR) .................. 10-2013-0155090

(51) Int. Cl.
| | | |
|---|---|---|
| B60T 13/14 | (2006.01) | |
| B60T 7/04 | (2006.01) | |
| B60T 13/68 | (2006.01) | |
| B60T 13/66 | (2006.01) | |
| B60T 8/36 | (2006.01) | |
| B60T 8/40 | (2006.01) | |

(52) U.S. Cl.
CPC ............ B60T 13/145 (2013.01); B60T 7/042 (2013.01); B60T 8/368 (2013.01); B60T 8/4081 (2013.01); B60T 13/146 (2013.01); B60T 13/662 (2013.01); B60T 13/686 (2013.01)

(58) Field of Classification Search
CPC ............ B60T 2270/604; B60T 13/145; B60T 13/686; B60T 13/146; B60T 7/042; B60T 8/4081
See application file for complete search history.

(56) References Cited

U.S. PATENT DOCUMENTS

| | | | | |
|---|---|---|---|---|
| 6,007,165 A | * | 12/1999 | Sato ........................ | B60T 8/175 303/113.2 |
| 6,966,614 B2 | * | 11/2005 | Hamzeh .................... | B60T 8/00 188/151 A |
| 7,014,277 B2 | * | 3/2006 | Soga ....................... | B60T 8/268 303/113.2 |

(Continued)

FOREIGN PATENT DOCUMENTS

JP 2008-260342 A 10/2008

*Primary Examiner* — Xuan Lan Nguyen
(74) *Attorney, Agent, or Firm* — Ladas & Parry LLP

(57) ABSTRACT

An integrated electro-hydraulic brake system includes a power source unit storing a pressure, discharging oil from a reservoir to an accumulator, and a motor driving the pump; and an integrated hydraulic control device including a master cylinder and generating a hydraulic pressure, a reservoir connected above the master cylinder and storing oil, an in-valve and an out-valve controlling pressure delivered from the accumulator to a wheel cylinder. The power source unit is provided as a separate unit to isolate operating noises, and the integrated hydraulic control device and the power source unit are connected by an external pipe, and the out-valve is provided as a normally open type-solenoid valve that is used at low current ranges, normally maintains an open state in order to reduce heat generation, but is closed when a close signal is received, compared to a normally close type-solenoid valve that normally maintains a close state.

11 Claims, 4 Drawing Sheets

(56) References Cited

U.S. PATENT DOCUMENTS

| | | | | |
|---|---|---|---|---|
| 2003/0209940 A1* | 11/2003 | Inage | B60T 8/365 | 303/87 |
| 2005/0162010 A1* | 7/2005 | Kamiya | B60T 8/409 | 303/113.4 |
| 2007/0114842 A1* | 5/2007 | Ohkubo | B60T 8/17616 | 303/115.1 |
| 2007/0126282 A1* | 6/2007 | Hwang | B60T 8/4081 | 303/10 |
| 2011/0025121 A1* | 2/2011 | Yang | B60T 7/042 | 303/15 |
| 2011/0285197 A1* | 11/2011 | Ganzel | B60T 7/042 | 303/2 |
| 2011/0291470 A1* | 12/2011 | Drumm | B60T 1/10 | 303/3 |
| 2012/0038208 A1* | 2/2012 | Matsushita | B60L 7/18 | 303/3 |
| 2012/0043806 A1* | 2/2012 | Linkenbach | B60T 8/348 | 303/113.1 |
| 2013/0241273 A1* | 9/2013 | Kim | B60T 13/142 | 303/6.01 |
| 2014/0008965 A1* | 1/2014 | Ito | B60T 8/4081 | 303/3 |

* cited by examiner

INTEGRATED ELECTRO-HYDRAULIC BRAKE SYSTEM

CROSS-REFERENCE TO RELATED APPLICATION

This application claims the benefit of Korean Patent Application No. 10-2013-0155090, filed on Dec. 13, 2013 in the Korean Intellectual Property Office, the disclosure of which is incorporated in its entirety herein by reference.

BACKGROUND

1. Field

Embodiments of the present invention relate to an electro-hydraulic brake system, and more specifically, to an integrated electro-hydraulic brake system that provides an actuator including a master cylinder, a pedal simulator, and the like, electronic stability control (ESC), and a hydraulic power unit (HPU) as a single unit.

2. Description of the Related Art

Recently, in order to improve fuel efficiency and reduce exhaust fumes, the development of hybrid vehicles, fuel cell vehicles, electric cars, and the like has been actively progressing. A brake device, that is, a brake device of an automotive brake system, is necessarily installed in such vehicles. Here, the automotive brake device refers to a device that reduces a speed of a running vehicle or stops the vehicle.

A brake device of a common automotive brake system includes a vacuum brake configured to generate braking power using a suction pressure of an engine and a hydraulic brake configured to generate braking power using a hydraulic pressure.

The vacuum brake is a device that may exert high braking power with a small force using a pressure difference between a suction pressure of a vehicle engine and an atmospheric pressure in a vacuum booster, and that is, a device that generates a much larger output compared to a force applied to the pedal when a driver presses a brake pedal. However, in the vacuum brake, the suction pressure of the vehicle engine needs to be supplied to the vacuum booster in order to generate a vacuum state. Therefore, fuel efficiency decreases and the engine needs to be constantly operated in order to generate a vacuum state even when the vehicle stops.

In addition, since the fuel cell vehicles and the electric cars have no engine, an application of an existing vacuum brake configured to amplify a pedal force of the driver while braking is unable. The hybrid vehicles need to introduce a hydraulic brake since an idling stop function needs to be implemented in order to improve fuel efficiency when the vehicle stops.

That is, as described above, all vehicles need to implement regenerative braking in order to improve fuel efficiency. When the hydraulic brake is introduced, implementation thereof is easy.

FIG. 1 illustrates an electro-hydraulic brake system which is a type of the hydraulic brake. In the electro-hydraulic brake system, when the driver presses the pedal, an electronic control unit detects the pressing, and a brake hydraulic pressure is delivered to a master cylinder and a wheel cylinder of each wheel, thereby generating braking power.

As illustrated in FIG. 1, the electro-hydraulic brake system includes units of an actuator 1 having a master cylinder 1a, a boosting unit 1b, a reservoir 1c, a pedal simulator 1d, and the like that control a brake hydraulic pressure delivered to a wheel cylinder 20, a modulator module 2 configured to independently control braking power of each wheel, and a hydraulic power unit (HPU) 3 having a motor, a pump, an accumulator, a valve, and the like. In this case, depending on a brake control method, an anti-lock brake system (ABS), a traction control system (TCS), an electronic stability control system (ESC), and the like may be selectively applied to the modulator module 2.

However, since each of the units 1, 2, and 3 constituting the electro-hydraulic brake system is separately provided and installed, an installing space needs to be secured due to a limited installing space of the vehicle, and a weight increases. Therefore, the electro-hydraulic brake system needs to secure the vehicle's safety, increased fuel efficiency, appropriate pedal feeling, and the like while braking, and an advanced electro-hydraulic brake system is required.

Meanwhile, when an out-valve configured to control a pressure of the wheel cylinder out of the valves used in the modulator module uses a normally close type-solenoid valve that normally maintains a close state according to a control characteristic, elasticity of a spring blocking a passage is large. In order to open the passage, since high current ranges need to be used, the control characteristic is deteriorated and heat generation is high.

Therefore, according to the above demands, research on development of an electro-hydraulic brake system that has a simple configuration, is able to smoothly implement braking power even when a failure occurs, and is easy to control is underway.

SUMMARY

In view of the above-described problems, the present invention provides an integrated electro-hydraulic brake system that has a simple configuration to improve safety of braking and to be easily installed in the vehicle, provides stable pedal feeling while braking, and is able to improve fuel efficiency by supporting regenerative braking.

The present invention also provides an integrated electro-hydraulic brake system that enables fast control by changing a type of a valve configured to control a flow of a hydraulic pressure and is able to stably control the flow of the hydraulic pressure even when the type of the valve is changed.

According to an aspect of the present invention, there is provided an integrated electro-hydraulic brake system. The system includes a power source unit including an accumulator configured to store a pressure of a predetermined level, a pump configured to suck oil from a reservoir and discharge the oil to the accumulator in order to generate a pressure in the accumulator, and a motor configured to drive the pump; and an integrated hydraulic control device including a master cylinder having two hydraulic circuits and configured to generate a hydraulic pressure, a reservoir connected above the master cylinder and configured to store oil, an in-valve and an out-valve configured to control a pressure delivered from the accumulator to a wheel cylinder installed in each wheel, a shut off valve configured to control a fluid pressure delivered from the master cylinder to the wheel cylinder, a pedal simulator connected to the master cylinder and configured to provide a reaction force of a brake pedal, and a simulation valve installed in a rear end of the pedal simulator, wherein the power source unit is provided as a separate unit in order to isolate operating noises, and the integrated hydraulic control device and the power source unit are connected by an external pipe, and the out-valve is provided as a normally open type-solenoid valve that is used at low current ranges, normally maintains an open state in order to reduce heat generation, but is closed when a close signal is received, compared to a normally close type-solenoid valve that normally maintains a close state.

The system may further include a control valve disposed in a connection passage connecting the out-valve and the reservoir and configured to perform control such that the fluid pressure flowing through the out-valve flows to the reservoir.

The control valve may be provided as the normally close type-solenoid valve that normally maintains a close state in order to prevent the fluid pressure generated from the master cylinder from flowing to the reservoir when the integrated electro-hydraulic brake system abnormally operates.

A simulation check valve may be further provided between the pedal simulator and the simulation valve, an outlet pressure of the pedal simulator due to a pedal force of the brake pedal may be delivered through only the simulation valve, and when the pedal force of the brake pedal is released, oil may be sucked and stored in the pedal simulator through the simulation check valve, and the simulation check valve may be connected to the reservoir through an oil passage.

The external pipe may connect the accumulator and a hydraulic pressure passage connected to the in-valve, and a check valve may be installed in the hydraulic pressure passage in order to prevent a back flow of the pressure.

The integrated hydraulic control device may include first and second backup passages that connect the master cylinder and the two hydraulic circuits in order to control a brake oil when the integrated electro-hydraulic brake system abnormally operates, and the shut off valve may include a first shut off valve installed in the first backup passage and configured to control a connection with the master cylinder and a second shut off valve installed in the second backup passage and configured to control a connection with the master cylinder.

The first and second shut off valves may be provided as normally open type-solenoid valves that normally maintain an open state but are closed in a normal braking state.

Each of the hydraulic circuits may include a normally open type-solenoid valve disposed upstream from the wheel cylinder and configured to control delivery of the fluid pressure to the wheel cylinder; a normally close type-solenoid valve disposed downstream from the wheel cylinder and configured to control discharge of the fluid pressure from the wheel cylinder; and a return passage connecting the normally close type-solenoid valve and the reservoir, and the return passage may be connected to the simulation valve.

A pulsation damper configured to minimize pressure pulsation may be provided in an inlet passage connecting the in-valve, the out-valve, and the two hydraulic circuits.

The in-valve may be provided as the normally close type-solenoid valve that normally maintains a close state.

BRIEF DESCRIPTION OF THE DRAWINGS

The present invention will be described in detail with reference to the accompanying drawings. Since these drawings illustrate exemplary embodiments of the present invention, the spirit and scope of the present invention will not be interpreted by and limited to these drawings.

DETAILED DESCRIPTION

Hereinafter, exemplary embodiments of the present invention will be described in detail with reference to the accompanying drawings. Moreover, terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

Figure 1:
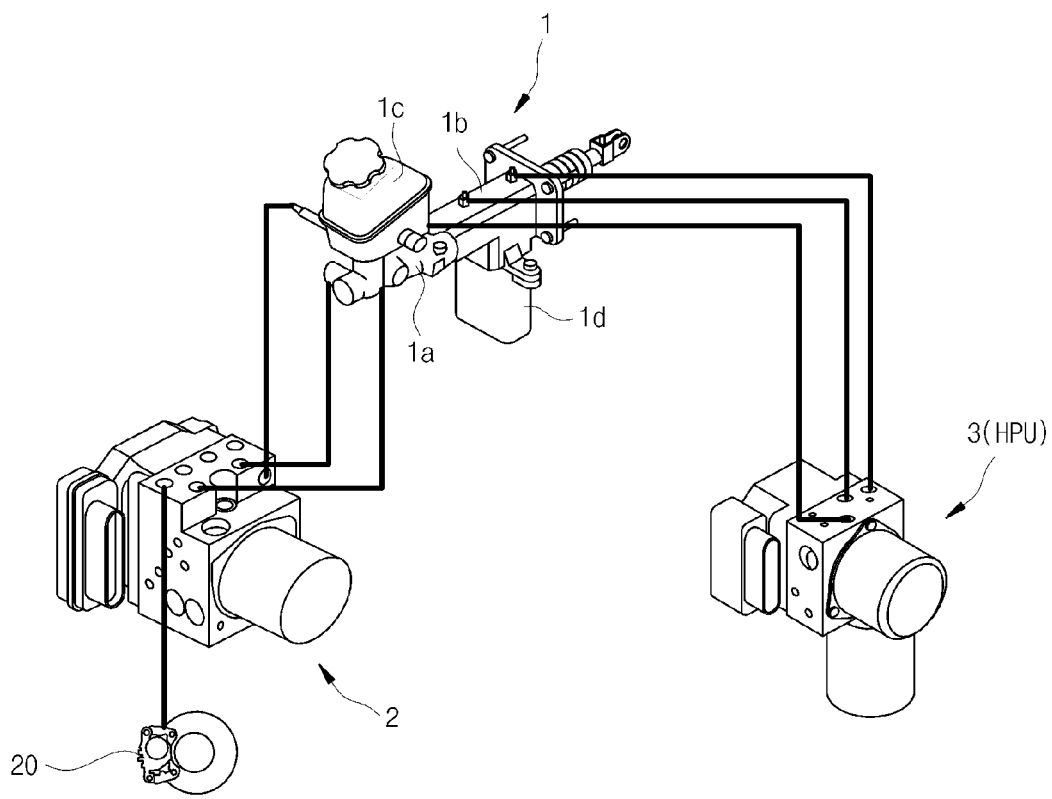
FIG. 1 is a diagram schematically illustrating a configuration of a conventional electro-hydraulic brake system.
Figure 2:
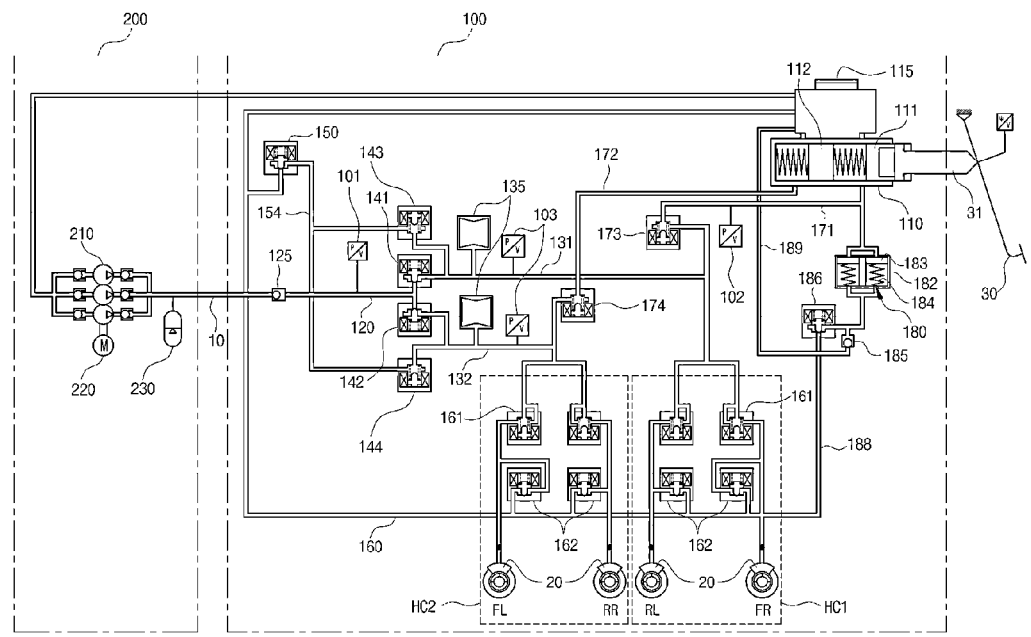
FIG. 2 is a hydraulic circuit diagram illustrating a non-braking state of an integrated electro-hydraulic brake system according to an exemplary embodiment of the present invention.

FIG. 2 is a hydraulic circuit diagram illustrating an integrated electro-hydraulic brake system according to an exemplary embodiment of the present invention;

The integrated electro-hydraulic brake system according to the present invention may mainly include two units such as an integrated hydraulic control device 100 and a power source unit 200. As illustrated in FIG. 2, the integrated hydraulic control device 100 includes a brake pedal 30 that is manipulated by a driver while braking, a master cylinder 110 configured to receive a force from the brake pedal 30, a reservoir 115 connected above the master cylinder 110 and configured to store oil, a hydraulic circuit HC1 is connected to two wheels RL and FR and a hydraulic circuit HC2 is connected to two wheels FL and RR, a pedal simulator 180 connected to the master cylinder 110 and configured to provide a reaction force of the brake pedal 30, and a simulation valve 186 installed in a passage 188 connecting the pedal simulator 180 and the reservoir 115. The power source unit 200 includes an accumulator 230 configured to store a pressure of a predetermined level, a pump 210 configured to suck the oil from the reservoir 115 and discharge the oil to the accumulator 230 in order to generate a pressure in the accumulator 230, and a motor 220 configured to drive the pump 210.

In addition, the integrated hydraulic control device 100 may further include pressure sensors 101, 102, and 103, in-valves 141 and 142 and out-valves 143 and 144 connected to the two hydraulic circuits HC1 and HC2, and the like in order to control a pressure delivered from the reservoir 115 or the accumulator 230 to the wheel cylinders 20 installed in the wheels FL, FR, RL, and RR.

In this case, the integrated hydraulic control device 100 and the power source unit 200 are connected by an external pipe 10. That is, the accumulator 230 of the power source unit 200 and a hydraulic pressure passage 120 of the integrated hydraulic control device 100 are connected by the external pipe 10. The power source unit 200 including the pump 210, the motor 220, and the accumulator 230 is configured as a separate unit in order to isolate operating noises. When the master cylinder 110, the reservoir 115, and the pedal simulator 180 are provided in the integrated hydraulic control device 100 as a single unit and functions of an electronic stability control system (ESC) module and a hydraulic power unit (HPU) module are included, it is possible to reduce a weight of an entire integrated electro-hydraulic brake system and improve an installing space.

Structures and functions of respective components of the integrated electro-hydraulic brake system will be described in greater detail.

The master cylinder 110 is able to generate a fluid pressure using a single chamber, but two chambers are used in this embodiment in order to secure safety in the event of breakdown. A first piston 111 and a second piston 112 are provided inside the chamber. The first and second pistons 111 and 112 are pressed by an input rod 31 connected to the brake pedal 30 according to a pedal force of the brake pedal 30, generate a hydraulic pressure, and are connected to the two hydraulic circuits HC1 and HC2, respectively. The master cylinder 110 receives the oil through the reservoir 115 installed on the top, and discharges the oil to the wheel cylinders 20 installed in the wheels RR, RL, FR, and FL through exits installed at the bottom.

In this case, as illustrated in FIG. 2, while the integrated electro-hydraulic brake system according to the present embodiment is exemplified to be installed in an X-Split (cross split) vehicle, the present invention is not limited thereto. Here, the cross split vehicle refers to a vehicle that performs braking of front wheels and rear wheels in a cross manner when two front wheels FL and FR and two rear wheels RL and RR are controlled. That is, between the two hydraulic circuits HC1 and HC2, the first hydraulic circuit HC1 is connected to the right-side front wheel FR and the left-side rear wheel RL of the vehicle, and the second hydraulic circuit HC2 is connected to the left-side front wheel FL and the right-side rear wheel RR.

Meanwhile, the hydraulic circuits HC1 and HC2 include a passage connected to the wheel cylinder 20, and a plurality of valves 161 and 162 configured to control a fluid pressure are installed in the passage. As illustrated, the plurality of valves 161 and 162 are classified as the solenoid valve 161 of a normally open type (hereinafter referred to as an "NO type") that is disposed upstream from the wheel cylinder 20 and controls delivery of the fluid pressure to the wheel cylinder, or the solenoid valve 162 of a normally close type (hereinafter referred to as an "NC type") that is disposed downstream from the wheel cylinder 20 and controls discharge of the fluid pressure from the wheel cylinder 20. Operation of opening and closing the solenoid valves 161 and 162 may be controlled by an electronic control unit (not illustrated) that is generally used.

In addition, each of the hydraulic circuits HC1 and HC2 includes a return passage 160 connecting the NC type-solenoid valve 162 of and the reservoir 115. The return passage 160 is configured to discharge the fluid pressure delivered to the wheel cylinder 20 and deliver the pressure to the reservoir 115. The return passage 160 is connected to the reservoir 115 and is also connected to the passage 188 in which the simulation valve 186 to be described below is installed. Therefore, when the simulation valve 186 is opened to flow the fluid pressure from the pedal simulator 180, the pressure is delivered to the reservoir 115.

At least one pump 210 is provided to generate a braking pressure by pumping the oil introduced from the reservoir 115 at a high pressure. The motor 220 configured to provide a driving force to the pump 210 is provided at a side of the pump 210. The motor 220 may be driven by receiving a driver's a braking intention resulting from a pedal force of the brake pedal 30 from the second pressure sensor 102 or a pedal displacement sensor (not illustrated) to be described below.

The accumulator 230 is provided at an exit side of the pump 210 and temporarily stores the high-pressure oil generated by driving the pump 210. That is, as described above, the accumulator 230 is connected to the hydraulic pressure passage 120 by the external pipe 10.

A check valve 125 is provided in the hydraulic pressure passage 120 in order to prevent a back flow of the oil. In addition, the first pressure sensor 101 is provided in the hydraulic pressure passage 120 to measure an oil pressure of the accumulator 230. At this time, the electronic control unit (not illustrated) compares the oil pressure measured by the first pressure sensor 101 with a set pressure. When the measured pressure is less than the set pressure, the pump 210 is driven to suck the oil of the reservoir 115 and the accumulator 230 is filled with the oil. The hydraulic pressure passage 120 is connected to the hydraulic circuits HC1 and HC2 through inlet passages 131 and 132.

The inlet passages 131 and 132 includes the first inlet passage 131 connected to the first hydraulic circuit HC1 and the second inlet passage 132 connected to the second hydraulic circuit HC2. The first inlet passage 131 includes the first in-valve 141 and the first out-valve 143 configured to control a brake oil stored in the accumulator 230. The second inlet passage 132 includes the second in-valve 142 and the second out-valve 144 configured to control a brake oil stored in the accumulator 230. That is, the brake oil of the accumulator 230 may be delivered to each of the wheel cylinders 20 through the first inlet passage 131 and the second inlet passage 132.

The first and second in-valves 141 and 142 are configured as the NC type-solenoid valves that normally maintain a close state. The first and second out-valves 143 and 144 are configured as the NO type-solenoid valves that normally maintain an open state. Therefore, when the driver presses the brake pedal 30, the first and second in-valves 141 and 142 are opened, the brake oil stored in the accumulator 230 is delivered to the wheel cylinder 20, and the first and second out-valves 143 and 144 are closed.

According to the embodiment of the present invention, in a connection passage 154 connecting the return passage 160 connected to the reservoir 115 and the out-valves 143 and 144, a control valve 150 is provided to perform control such that the fluid pressure flowing through the out-valves 143 and 144 flows to the reservoir 115. The control valve 150 is configured as the NC type-solenoid valve that normally maintains a close state, and is opened when the fluid pressure is reduced such that the oil is delivered to the reservoir 115. Also, the control valve 150 normally maintains a close state and prevents the fluid pressure generated from the master cylinder 110 from flowing to the reservoir 115 when the integrated electro-hydraulic brake system abnormally operates.

Meanwhile, the integrated hydraulic control device 100 may further include a pulsation damper 135 that is provided in the first inlet passage 131 and the second inlet passage 132 and minimizes pressure pulsation. The pulsation damper 135 is a device that may temporarily store oil in order to reduce pulsation generated between the in-valves 141 and 142, the out-valves 143, and 144, and the NO type-solenoid valve

161. Since the pulsation damper is well-known technology in the field of this technology, detailed description thereof will be omitted.

Un-described reference numeral "103" denotes the third pressure sensor that is installed in the first and second inlet passages 131 and 132 and detects a brake hydraulic pressure delivered to the inlet passages 131 and 132. Therefore, the pulsation damper 135 may be controlled such that the pulsation reduces according to the brake oil pressure detected by the third pressure sensor 103.

According to the present invention, a first backup passage 171 and a second backup passage 172 may be provided to connect the master cylinder 110 and the two hydraulic circuits HC1 and HC2 when the integrated electro-hydraulic brake system breaks down. A first shut off valve 173 configured to open and close the first backup passage 171 is provided in the middle of the first backup passage 171. A second shut off valve 174 configured to open and close the second backup passage 172 is provided in the middle of the second backup passage 172. The first backup passage 171 is connected to the first inlet passage 131 through the first shut off valve 173. The second backup passage 172 is connected to the second inlet passage 132 through the second shut off valve 174. In particular, the second pressure sensor 102 configured to measure an oil pressure of the master cylinder 110 may be provided between the first shut off valve 173 and the master cylinder 110. In a normal braking state, the backup passages 171 and 172 are blocked by the first shut off valve 173 and the second shut off valve 174, and a braking intention required by the driver may be determined by the second pressure sensor 102.s The first and second shut off valves 173 and 174 are configured as the NO type-solenoid valve that is normally opened but is closed in a normal braking state. Therefore, when the brake hydraulic pressure is delivered to the wheel cylinder 20 through the first and second inlet passages 131 and 132, the first and second shut off valves 173 and 174 are closed, the oil does not flow to the backup passages 171 and 172 and is smoothly delivered to the wheel cylinder 20.

According to the present invention, the pedal simulator 180 configured to generate a pedal force of the brake pedal 30 is provided between the second pressure sensor 102 and the master cylinder 110.

The pedal simulator 180 includes a simulation chamber 182 configured to store oil discharged from an exit side of the master cylinder 110 and the simulation valve 186 connected to a rear end of the simulation chamber 182. The simulation chamber 182 includes a piston 183 and an elastic member 184 and is formed to have displacement of a predetermined level by the oil introduced into the simulation chamber 182.

The simulation valve 186 is connected to the passage 188 connecting a rear end of the pedal simulator 180 and the reservoir 115. As illustrated, an entrance of the pedal simulator 180 is connected to the master cylinder 110, the simulation valve 186 is installed in a rear end of the pedal simulator 180, and an exit of the simulation valve 186 is connected to the return passage 160 connected to the reservoir 115 through the passage 188. Therefore, the pedal simulator 180, that is, an entire inside of the simulation chamber 182, is filled with the oil.

The simulation valve 186 is configured as the NC type-solenoid valve that normally maintains a close state but is opened when the driver presses the brake pedal 30.

In addition, a simulation check valve 185 is provided between the pedal simulator 180 and the master cylinder 110, that is, between the pedal simulator 180 and the simulation valve 186. The simulation check valve 185 is connected to the reservoir 115 through an oil passage 189 such that the oil flows from the reservoir 115 to the simulation chamber 182. The simulation check valve 185 is configured to deliver an outlet pressure of the pedal simulator 180 due to the pedal force of the brake pedal 30 through only the simulation valve 186. In other words, when the piston 183 of the pedal simulator 180 compresses the spring 184, the oil in the simulation chamber 182 is delivered to the reservoir 115 through the simulation valve 186 and the passage 188. Therefore, since the inside of the simulation chamber 182 is filled with the oil, when the pedal simulator 180 operates, friction of the piston 183 is minimized, durability of the pedal simulator 180 improves, and introduction of foreign materials from the outside is blocked.

In addition, when the pedal force of the brake pedal 30 is released, the oil is supplied to the simulation chamber 182 through the simulation check valve 185, and thus fast return of the pressure of the pedal simulator 180 is secured. The simulation check valve 185 is preferably configured as a pipe check valve having no spring such that a residual pressure of the pedal simulator 180 is restored when the pedal force of the brake pedal 30 is released.

The integrated hydraulic control device 100 as described above may be provided as a single block including the electronic control unit (ECU: not illustrated) that is electrically connected to and controls each valve and sensor. Accordingly, it is possible to implement a compact integrated electro-hydraulic brake system. That is, the integrated electro-hydraulic brake system according to the embodiment of the present invention may easily secure the installing space and address a problem due to a weight increase through the integrated hydraulic control device 100 in which the power source unit 200 including the motor 220, the pump 210, and the accumulator 230, various types of valves and sensors, and the pedal simulator 180 configured to generate a pedal force of the brake pedal 30 are provided in the form of a single block.

Hereinafter, operations of an integrated electro-hydraulic brake system according to an exemplary embodiment of the present invention will be described in detail.

Figure 3:
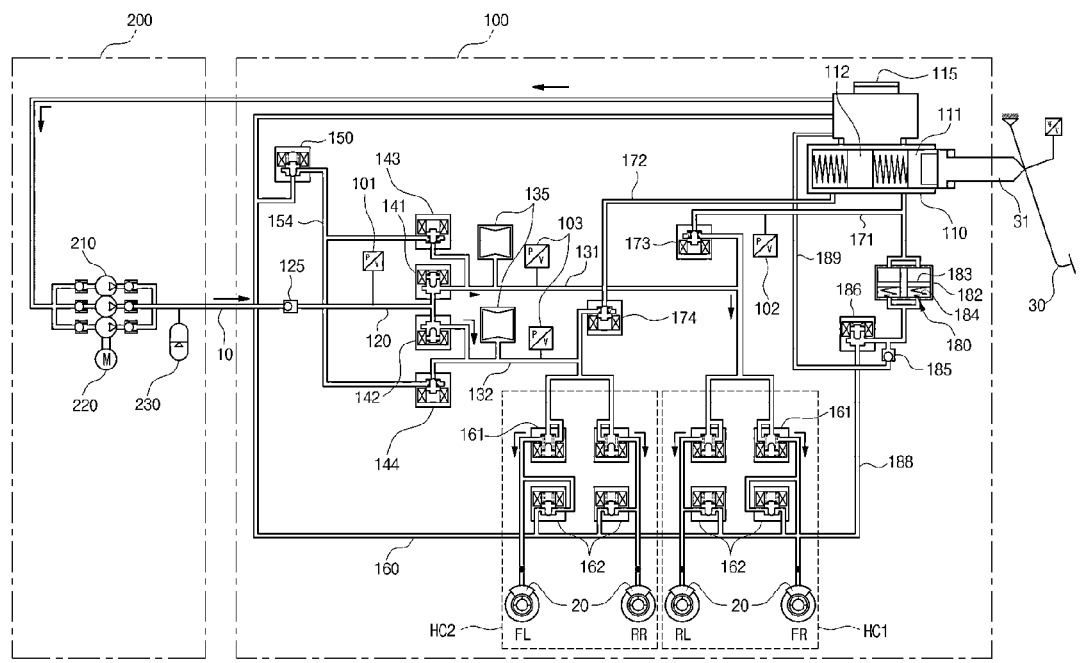
FIG. 3 is a hydraulic circuit diagram illustrating a normal operating state of the integrated electro-hydraulic brake system according to the exemplary embodiment of the present invention.

FIG. 3 is a hydraulic circuit diagram illustrating a normal operating state of the integrated electro-hydraulic brake system.

As illustrated in FIG. 3, when the driver starts to brake, a braking amount required by driver may be detected by pressure information of the brake pedal 30 pressed by the driver through the second pressure sensor 102, the pedal displacement sensor (not illustrated), and the like. The ECU (not illustrated) may receive a size of a regenerative braking amount and calculate a size of a friction braking amount based on a difference between the braking amount required by the driver and the regenerative braking amount. Accordingly, it is possible to determine a size of an increased or decreased pressure of a wheel side.

Specifically, when the driver presses the brake pedal 30 during initial braking, it may be controlled such that braking of the vehicle is sufficiently performed by regenerative braking and a braking amount due to friction is not generated. Therefore, it is necessary to reduce the pressure of the brake oil of the brake such that the hydraulic pressure that is delivered to the brake pedal 30 and generated in the master cylinder 110 is not delivered to the wheel cylinder 20. At this time, when the out-valves 143 and 144 are opened and the hydraulic pressure generated in the inlet passages 131 and 132 is discharged to the reservoir 115, no pressure is generated in the wheels RR, RL, FR, and FL and the pressure of the brake pedal may be maintained without change.

Then, a process of regulating the friction braking amount may be performed according to a change in the regenerative braking amount. The regenerative braking amount is changed according to a charge state of a battery or a speed of the vehicle. The regenerative braking amount significantly decreases below a predetermined vehicle speed. In order to handle such a situation, the first in-valve 141 may control a flow rate of the brake oil delivered from the accumulator 230 to the first inlet passage 131 in order to control a hydraulic pressure of the wheel cylinder 20. Similarly, the second in-valve 142 may control a flow rate of the brake oil delivered from the accumulator 230 to the second inlet passage 132.

Then, since there is no regenerative braking amount, braking may be performed according to a general braking condition.

Meanwhile, the pressure generated by pressing the master cylinder 110 resulting from the pedal force of the brake pedal 30 is delivered to the pedal simulator 180 connected to the master cylinder 110. At this time, the simulation valve 186 installed in the passage 188 connecting a rear end of the pedal simulator 180 and the reservoir 115 is opened and the oil filled in the simulation chamber 182 is delivered to the reservoir 115 through the simulation valve 186. In addition, a pressure corresponding to loads of the piston 183 and the spring 184 supporting the piston 183 provides appropriate pedal feeling to the driver through the simulation chamber 182. In addition, when the pedal force of the brake pedal 30 is released, the oil is additionally filled in the simulation chamber 182 through the simulation check valve 185 so that fast return of the pressure of the pedal simulator 180 is secured.

Figure 4:
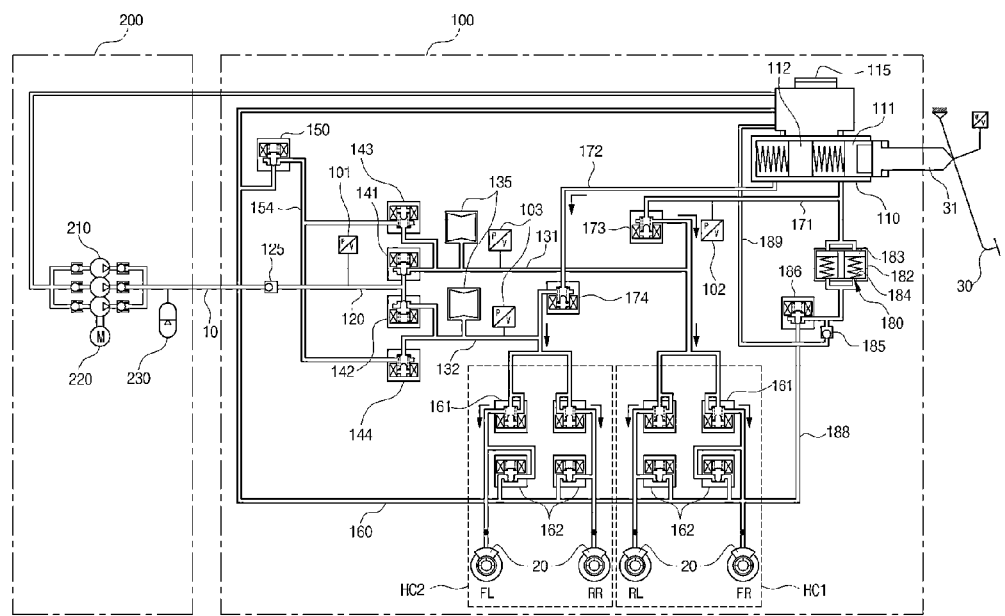
FIG. 4 is a hydraulic circuit diagram illustrating an abnormal operating state of the integrated electro-hydraulic brake system according to the exemplary embodiment of the present invention.

FIG. 4 is a hydraulic circuit diagram illustrating a case in which the integrated electro-hydraulic brake system abnormally operates.

As illustrated in FIG. 4, when the integrated electro-hydraulic brake system abnormally operates, the fluid pressure is delivered to the wheel cylinder 20 through the first and second backup passages 171 and 172 in order to perform backup braking and braking power is implemented. At this time, the first and second shut off valves 173 and 174 installed in the first and second backup passages 171 and 172 and the NO type-solenoid valves 161 of the two hydraulic circuits HC1 and HC2 are opened, and the control valve 150 connected to the first and second in-valves 141 and 142 and the first and second out-valves 143 and 144 is configured as the NC-type solenoid valve in a close state. Accordingly, the fluid pressure is directly delivered to the wheel cylinder 20. In addition, in the pedal simulator 180 connected below the master cylinder 110, the simulation valve 186 is configured as the NC-type solenoid valve in a close state. When a flow of the oil is blocked by the simulation check valve 185 configured to control one-way flow, the fluid pressure is efficiently delivered to the wheel cylinder 20. Accordingly, since safe braking may be performed, it is possible to improve braking safety.

Meanwhile, the master cylinder 110 is preferably formed to have a smaller internal diameter than a conventional master cylinder such that mechanical braking performance according to the pedal force of the brake pedal 30 is maximized. That is, it should be understood that the master cylinder has a smaller internal diameter than an existing master cylinder, and sufficient braking power may be exerted through the brake oil stored in s decreased internal diameter even when the internal diameter decreases.

The integrated electro-hydraulic brake system according to the embodiment of the present invention has the following effects.

First, it is possible to easily secure an installing space, address a problem caused by an increased weight, and secure easy assembly through an integrated hydraulic control device in which a power source unit having a motor, a pump, and an accumulator, a master cylinder, various types of valves and sensors, and a pedal simulator configured to generate a pedal force of a brake pedal are provided in the form of a single block.

Second, since an out-valve is provided as a normally open type-solenoid valve that is used at low current ranges and has small heat generation, it is possible to improve a control characteristic when the brake is released. Also, a control valve provided as a normally close type-solenoid valve is separately disposed in a passage connecting the out-valve and a reservoir. Therefore, even when a system abnormally operates, it is possible to prevent the pressure from leaking to the reservoir, thereby stably controlling a flow of a hydraulic pressure.

Third, when the pedal simulator is connected to the reservoir and a simulation valve controlling the same is provided, oil is stored in the pedal simulator. Therefore, it is possible to improve durability of the pedal simulator and prevent foreign materials from being introduced from the outside. In addition, a residual pressure is minimized by a simulation check valve having no spring, and it is possible to stably maintain pedal feeling delivered to the driver even when the pressure is arbitrarily regulated while braking.

Fourth, since braking of the vehicle is possible in the event of breakdown of the brake system, the system may be easily applied to electric cars, fuel cell vehicles, and hybrid vehicles.

Fifth, regardless of the engine and an operation thereof, it is possible to implement braking power required by the driver, which contributes to improving fuel efficiency.

Sixth, since the system has a simper configuration than a conventional negative pressure booster and does not use a suction pressure of the engine unlike a vacuum brake, it is possible to improve fuel efficiency of the vehicle. Due to its simple configuration, it is easy to apply to small cars.

As described above, while the present invention has been described with reference to specific embodiments and drawings, the present invention is not limited thereto. It is apparent by those skilled in the art that various modifications and alternations may be made without departing from the spirit and scope of the present invention and equivalents of the appended claims.

What is claimed is:

1. An integrated electro-hydraulic brake system, comprising:
    a power source unit including an accumulator configured to store a pressure of a predetermined level, a pump configured to suck oil from a reservoir and discharge the oil to the accumulator in order to generate a pressure in the accumulator, and a motor configured to drive the pump;
    an integrated hydraulic control device including a master cylinder having two hydraulic circuits and configured to generate a hydraulic pressure, the reservoir connected above the master cylinder and configured to store oil, an in-valve and an out-valve configured to control a pressure delivered from the accumulator to a wheel cylinder installed in each wheel, a shut off valve configured to control a fluid pressure delivered from the master cylinder to the wheel cylinder, a pedal simulator connected to the master cylinder and configured to provide a reaction force of a brake pedal, and a simulation valve installed in a rear end of the pedal simulator; and a control valve disposed in a connection passage connecting the out-valve and the reservoir and configured to perform control such that the fluid pressure flowing through the out-valve flows to the reservoir, wherein the control valve is provided as the normally close type-solenoid valve that normally maintains a close state in order to prevent the fluid pressure generated from the master cylinder from flowing to the reservoir when the integrated electro-hydraulic brake system abnormally operates, and wherein the out-valve is provided as a normally open type-solenoid valve that normally maintains an open state in order to reduce heat generation.

2. The system according to claim 1, wherein a simulation check valve is further provided between the pedal simulator and the simulation valve, an outlet pressure of the pedal simulator due to a pedal force of the brake pedal is delivered through only the simulation valve, and when the pedal force of the brake pedal is released, oil is sucked and stored in the pedal simulator through the simulation check valve, and the simulation check valve is connected to the reservoir through an oil passage.

3. The system according to claim 1, wherein a external pipe connects the accumulator and a hydraulic pressure passage connected to the in-valve, and a check valve is installed in the hydraulic pressure passage in order to prevent a back flow of the pressure.

4. The system according to claim 1, wherein the integrated hydraulic control device includes first and second backup passages that connect the master cylinder and the two hydraulic circuits in order to control a brake oil when the integrated electro-hydraulic brake system abnormally operates, and the shut off valve includes a first shut off valve installed in the first backup passage and configured to control a connection with the master cylinder and a second shut off valve installed in the second backup passage and configured to control a connection with the master cylinder.

5. The system according to claim 4, wherein the first and second shut off valves are provided as normally open type-solenoid valves that normally maintain an open state but are closed in a normal braking state.

6. The system according to claim 1, wherein each of the hydraulic circuits includes:

a normally open type-solenoid valve disposed upstream from the wheel cylinder and configured to control delivery of the fluid pressure to the wheel cylinder;

a normally close type-solenoid valve disposed downstream from the wheel cylinder and configured to control discharge of the fluid pressure from the wheel cylinder; and a return passage connecting the normally close type-solenoid valve and the reservoir, and wherein the return passage is connected to the simulation valve.

7. The system according to claim 1, wherein a pulsation damper configured to minimize pressure pulsation is provided in an inlet passage connecting the in-valve, the out-valve, and the two hydraulic circuits.

8. The system according to claim 7, wherein the in-valve is provided as the normally close type-solenoid valve that normally maintains a close state.

9. The system of claim 1, wherein the in-valve comprises a first in-valve and a second in-valve, and the out-valve comprises a first out-valve and a second out-valve, and the system further comprises a hydraulic pressure passage connected to the external pipe and separated into one connected to the first in-valve which is connected to a first hydraulic circuit and another connected to the second in-valve which is connected a second hydraulic circuit.

10. The system of claim 1, wherein the power source unit is provided as a separate unit in order to isolate operating noises, and the integrated hydraulic control device and the power source unit are connected by an external pipe.

11. The system of claim 1, wherein the out-valve is closed when a close signal is received, and is used at low current ranges compared to a normally close type-solenoid valve that normally maintains a close state.

* * * * *